United States Patent
Rice

(10) Patent No.: US 8,860,789 B1
(45) Date of Patent: Oct. 14, 2014

(54) APPARATUS FOR PRODUCING THREE DIMENSIONAL IMAGES

(71) Applicant: Vic G. Rice, San Jose, CA (US)

(72) Inventor: Vic G. Rice, San Jose, CA (US)

(*) Notice: Subject to any disclaimer, the term of this patent is extended or adjusted under 35 U.S.C. 154(b) by 0 days.

(21) Appl. No.: 13/710,186

(22) Filed: Dec. 10, 2012

Related U.S. Application Data

(60) Provisional application No. 61/569,181, filed on Dec. 9, 2011.

(51) Int. Cl.
| | |
|---|---|
| H04N 13/02 | (2006.01) |
| H04N 5/225 | (2006.01) |
| H04N 13/00 | (2006.01) |
| G03B 15/10 | (2006.01) |
| F16M 11/42 | (2006.01) |
| H04N 13/04 | (2006.01) |

(52) U.S. Cl.
CPC .............. *H04N 5/2254* (2013.01); *G03B 15/10* (2013.01); *F16M 11/42* (2013.01); *H04N 13/0003* (2013.01); *H04N 13/0296* (2013.01); *H04N 13/0431* (2013.01); *H04N 13/0055* (2013.01); *H04N 13/0221* (2013.01)
USPC ................... 348/50; 348/51; 348/52; 348/53; 348/54; 348/55; 348/56; 348/57; 348/58; 348/59; 348/60

(58) Field of Classification Search
CPC .......... H04N 13/0055; H04N 13/0221; H04N 13/0296; H04N 13/0431; H04N 13/0003; H04N 5/232; G03B 15/10; F16M 11/42
USPC .......................................................... 348/50
See application file for complete search history.

(56) References Cited

U.S. PATENT DOCUMENTS

| | | | | |
|---|---|---|---|---|
| 2,051,192 | A * | 8/1936 | Wittel | 396/437 |
| 2,179,630 | A * | 11/1939 | Hillman | 226/57 |
| 3,168,284 | A * | 2/1965 | Fisher | 254/8 R |
| 3,613,546 | A * | 10/1971 | Richardson | 396/428 |
| 4,360,187 | A * | 11/1982 | Chapman | 254/8 R |
| 4,805,019 | A * | 2/1989 | Holliday | 348/139 |
| 4,952,953 | A * | 8/1990 | Ridderstolpe et al. | 396/428 |
| 5,237,407 | A * | 8/1993 | Crezee et al. | 348/89 |
| 5,473,364 | A * | 12/1995 | Burt | 348/47 |
| 5,842,048 | A * | 11/1998 | Zander | 396/6 |

(Continued)

OTHER PUBLICATIONS

David E. Roberts, "History of Lenticular and Related Autostereoscopic Method", "History of Lenticular and related Autostereoscopic Methods", Jan. 1, 2003, Publisher: Leap Technologies, LLC., Published in: US.

(Continued)

*Primary Examiner* — Andy Rao
*Assistant Examiner* — Shan Elahi
(74) *Attorney, Agent, or Firm* — Stuart J. West; Shaun Sluman; West & Associates, A PC

(57) ABSTRACT

An apparatus and method for creating a three dimensional image. The apparatus can scan an object from a plurality of locations along a curved track to create a frame set. One or more frame sets can be composited into an image to create a three dimensional scene. The image can be interlaced and viewed through a lenticular lens. During composition of the image, the positioning, spacing and order of the frames within a frame set can be manipulated to adjust the location, depth, and animation mode of each object within the three dimensional scene.

9 Claims, 13 Drawing Sheets

(56) References Cited

U.S. PATENT DOCUMENTS

| | | | |
|---|---|---|---|
| 5,946,077 A * | 8/1999 | Nemirovskiy | 355/22 |
| 5,956,079 A * | 9/1999 | Ridgley | 348/89 |
| 6,137,855 A * | 10/2000 | Hill et al. | 377/8 |
| 6,226,093 B1 * | 5/2001 | Lo et al. | 358/1.11 |
| 6,247,498 B1 * | 6/2001 | Chapman | 137/636.1 |
| 7,408,654 B1 * | 8/2008 | Hardin et al. | 356/617 |
| 7,565,003 B2 * | 7/2009 | Ashizaki et al. | 382/154 |
| 8,205,841 B2 * | 6/2012 | Wood | 248/129 |
| 8,360,663 B1 * | 1/2013 | Lin | 396/428 |
| 2004/0129534 A1 * | 7/2004 | Prentice et al. | 198/502.2 |
| 2007/0073439 A1 * | 3/2007 | Habibi et al. | 700/213 |
| 2007/0095246 A1 * | 5/2007 | Heiligenmann | 104/307 |
| 2007/0251408 A1 * | 11/2007 | Fletcher et al. | 104/247 |
| 2008/0001104 A1 * | 1/2008 | Voigt et al. | 250/559.46 |
| 2009/0157519 A1 * | 6/2009 | Bishop et al. | 705/19 |
| 2009/0174769 A1 * | 7/2009 | Katz | 348/143 |
| 2009/0315288 A1 * | 12/2009 | Hernandez | 280/79.3 |
| 2010/0142036 A1 * | 6/2010 | Sterns et al. | 359/363 |
| 2010/0142039 A1 * | 6/2010 | Hammer | 359/384 |
| 2010/0187783 A1 * | 7/2010 | Rosen | 280/47.11 |
| 2012/0224844 A1 * | 9/2012 | Chen et al. | 396/535 |
| 2012/0290609 A1 * | 11/2012 | Britt | 707/769 |

OTHER PUBLICATIONS

Matt Richardson, "Video: How-To: Holography","Video: How-To: Holography", Nov. 24, 2011, Publisher: http://www.litiholo.com/, Published in: US.

* cited by examiner

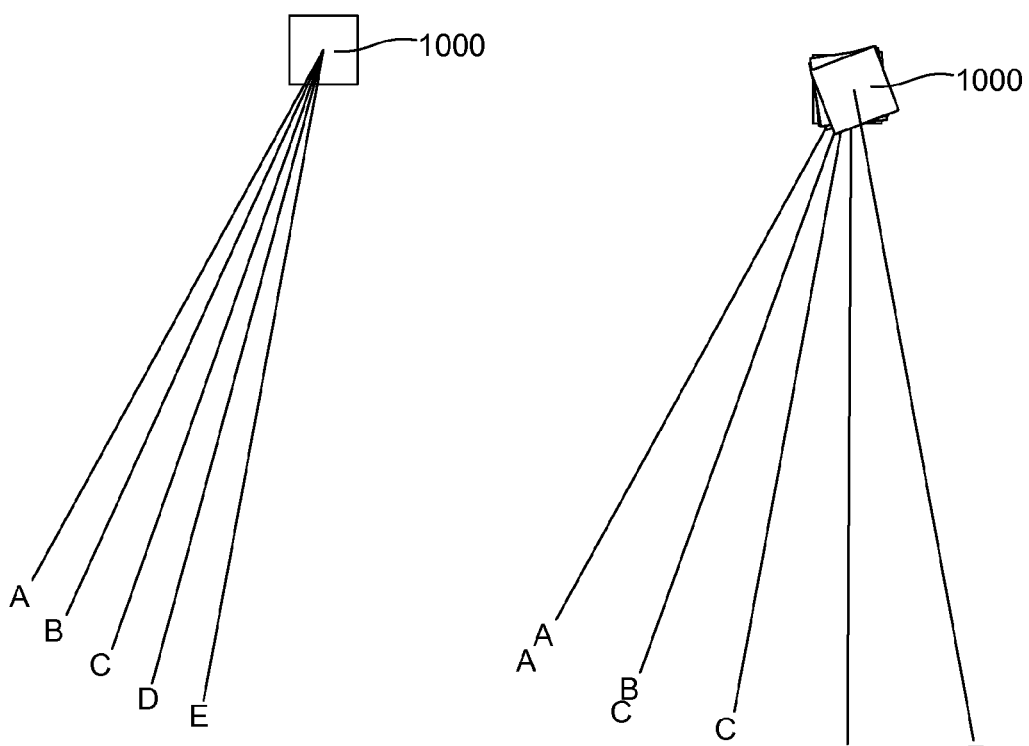
FIG. 13A
FIG. 13B
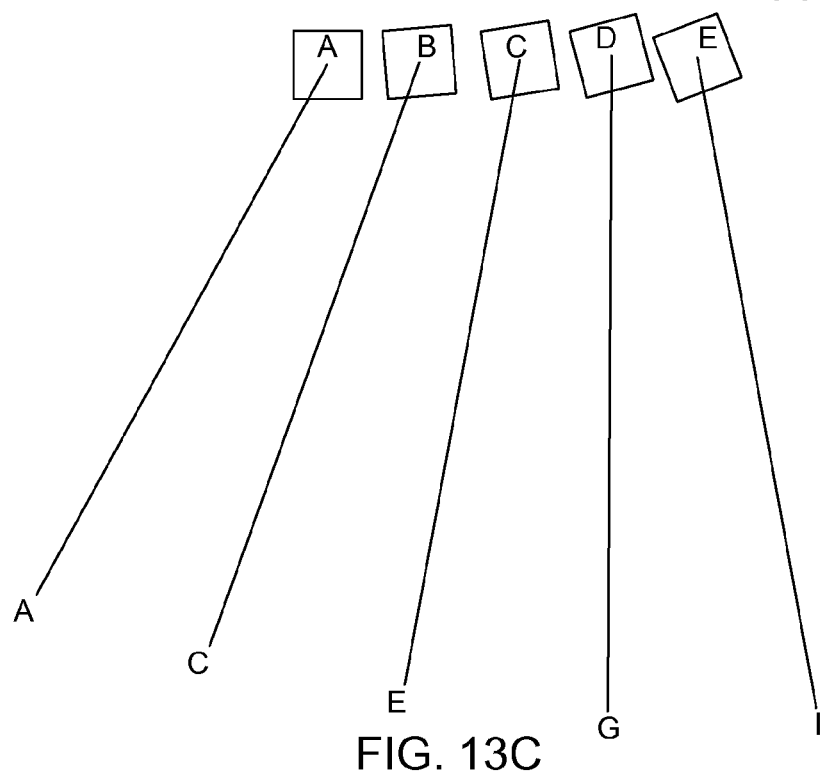
FIG. 13C

US 8,860,789 B1

APPARATUS FOR PRODUCING THREE DIMENSIONAL IMAGES

CLAIM OF PRIORITY

This Application claims priority under 35 U.S.C. §119(e) from earlier filed U.S. Provisional Application Ser. No. 61/569,181, filed Dec. 9, 2011, by Vic G. Rice, the entirety of which is incorporated herein by reference.

BACKGROUND

1. Field of the Invention

The present invention relates generally to three dimensional lenticular images, and in particular to an apparatus and method for producing three dimensional lenticular images that can have a realistic appearance.

2. Background

Two dimensional images are well known. Humans have created two dimensional images via painting, photography, or other methods for centuries. However, it can be desirable to present and view three dimensional images in order to convey depth and the appearance of reality.

Human beings perceive depth through binocular vision in which the left eye sees a slightly different image than the right eye. Some past attempts at presenting a three dimensional image rely on stereoscopic display methods that allow each eye to perceive a different image. Many stereoscopic systems require the viewer to wear glasses with specialized lenses, such as anaglyph lenses, polarized lenses, or active shutter 3D glasses, but these specialized glasses can be uncomfortable for the viewer. Other stereoscopic systems use methods that do not require glasses, such as a parallax barrier in which small barriers are placed in front of an image such that each eye sees different portions of the image through gaps between the barriers. However, regardless of whether or not glasses are used, stereoscopic systems only present two images. The viewer's left eye will always see the same left eye image, and the viewer's right eye will always see the same right eye image, and therefore the viewer is limited to viewing the image from the viewpoint chosen by the author of the image. The viewer cannot use a stereoscopic system to, move around and see the three dimensional image from a variety of different angles, which can enhance the perception of depth and make the image seem more realistic than a stereoscopic image.

Three dimensional images displayed using lenticular lenses attempt to solve this problem. Lenticular lenses comprise a plurality of lenticules positioned side by side. Lenticules are lenses that can magnify interlaced slices of an image. Multiple slices, can be viewed through each lenticule, with the angle of view determining which slice is perceived by the viewer. Lenticular lenses can therefore display a scene from multiple angles, as different images can be displayed depending on the angle of view. Three dimensional images can be displayed using lenticular lenses by presenting images of different viewpoints of the same scene at different viewing angles.

Traditionally, three dimensional lenticular scenes have been captured, by moving a camera to different horizontal positions and taking pictures of the entire scene from varying locations. However, this method can produce objects that are out of focus because the camera can be focused on one object while not being focused on other objects in the scene, or because the camera is positioned at varying distances from objects within the scene while taking pictures. Additionally, when the entire scene is photographed at the same time, individual objects cannot be, positioned at other locations within the three dimensional scene or animated after the pictures have been taken.

Another method for creating lenticular images uses software to process a single image using multiple image layers, alpha channel masks, and depth masks to synthesize a three dimensional scene. However, this method can require a lot of artistic effort, can introduce artifacts and distortions, and can result in images that have limited three dimensional depth and lack the appearance of reality.

What is needed is an apparatus and method for creating three dimensional scenes that allow objects to be photographed individually and composited into a three dimensional scene, while also maintaining the ability for each object to be positioned in three dimensional space within the scene or be animated after being photographed, without introducing artifacts or distortions and allowing a viewer's eye to properly focus on any object in the scene in a realistic manner.

BRIEF DESCRIPTION OF THE DRAWINGS

FIG. 13A depicts a top view of an example of viewpoints from which a hyperscopic object can be scanned.

FIG. 13B depicts a top view of an example of hyperscopic frames manipulated to be seen from different viewpoints.

FIG. 13C depicts a top view of an example of individual viewpoints of a hyperscopic object.

DETAILED DESCRIPTION

Figure 1:
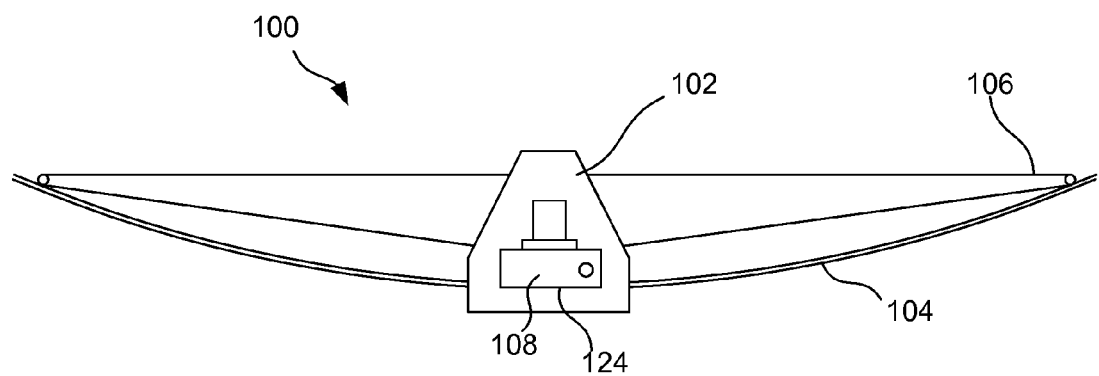
FIG. 1 depicts a top view of an embodiment of a scanning apparatus.

FIG. 1 depicts a scanning apparatus 100. The scanning apparatus 100 can comprise one or more dollies 102 and a track 104. One or more cameras 108 can rest on or be coupled with the dolly 102. In some embodiments, the scanning apparatus can further comprise a pulley system 106 that can move the dolly 102 along the track 104. In alternate embodiments, the dolly 102 can be moved along the tack 104 by motorized wheels, conveyor belts housed within the track 104, or any other system of locomotion.

Figure 2:
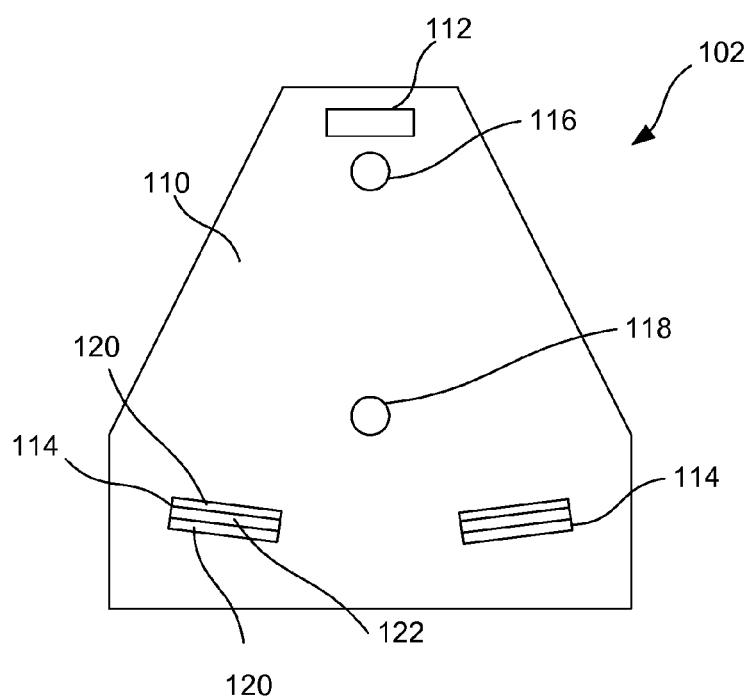
FIG. 2 depicts a bottom, view of an embodiment of a dolly.

FIG. 2 depicts a bottom, view of the dolly 102. The dolly 102 can comprise a platform 110, one or more wheels 112, one or more track guides 114, at least one front attachment point 116, and at least one back attachment point 118. The platform 110 can be a substantially flat member. In some embodiments, the platform 110 can have a substantially triangular shape. In alternate embodiments, the platform 110 can be a rectangle, oval, or have any other shape. The platform 110 can be made of resin, wood, plastic, metal, or any other material or combination of materials.

In some embodiments the top side of the platform 110 can be flat such that the camera 108 can rest on the top of the platform 110. The camera 108 can be a digital camera, analog camera, video camera, ciné camera, web camera, or any other type of camera. In alternate embodiments, the top side of the platform 110 can comprise an attachment mechanism 124 configured to hold the camera 108 in place. In some embodiments, the attachment mechanism 124 can be an indentation into the top of the platform 110. In alternate embodiments, the attachment mechanism 124 can be a tripod mount, straps, clips, or any other device capable of holding a camera 108 in place. In some embodiments, the attachment mechanism 124 can allow the camera 108 to be angled vertically or horizontally as desired.

The one or more wheels 112 can be coupled with the underside of the platform 110. One or more wheels 112 can be located at the front end of the platform 110, the back end of the platform 110, the middle of the platform 110, or at any other location on the platform 110. In some embodiments, each wheel 112 can be locked in position such that it can move linearly. In alternate embodiments, each wheel 112 can swivel such that the wheel 112 can move in any direction. The wheels 112 can be made of resin, wood, metal, plastic, or any other material or combination of materials.

The one or more track guides 114 can be coupled with the underside of the platform 110. In some embodiments, the track guide 114 can comprise two or more protrusions 120. The protrusions 120 can be spaced apart to form a groove 122 between the protrusions 120, such that the track 104 can fit into the groove 122. The protrusions 120 can be rails, pegs, walls, or any other protrusions. In alternate embodiments, the track guide 114 can be a groove 122 indented into the underside of the platform 110. In some embodiments, each track guide 114 can be a wheel 112 comprising a groove 122 around the circumference of the wheel 112 such that the track 104 can fit into the groove 122. The track guides 114 can be made of resin, wood, metal, plastic, or any other material or combination of materials.

The front attachment points 116 can be coupled with the platform 110 at or near the front end of the platform 110. In some embodiments, the front attachment points 116 can be coupled with the underside of the platform 110. In alternate embodiments, the front attachment points 116 can be coupled with the top side of the platform 110. Each front attachment point 116 can be a protrusion adapted to be coupled with the pulley system 106. Each front attachment point 116 can be an idler pulley, pin, hook, loop, or any other protrusion.

The back attachment points 118 can be coupled with the platform 110 at a point between the front attachment points 116 and the back end of the platform 110. In some embodiments, the back, attachment points 118 can be coupled with the underside of the platform 110. In alternate embodiments, the back attachment points 118 can be coupled with the top side of the platform 110. Each back attachment point 118 can be a protrusion adapted to be coupled with the pulley system 106. Each back attachment point 118 can be an idler pulley, pin, hook, loop, or any other protrusion.

Figure 3:
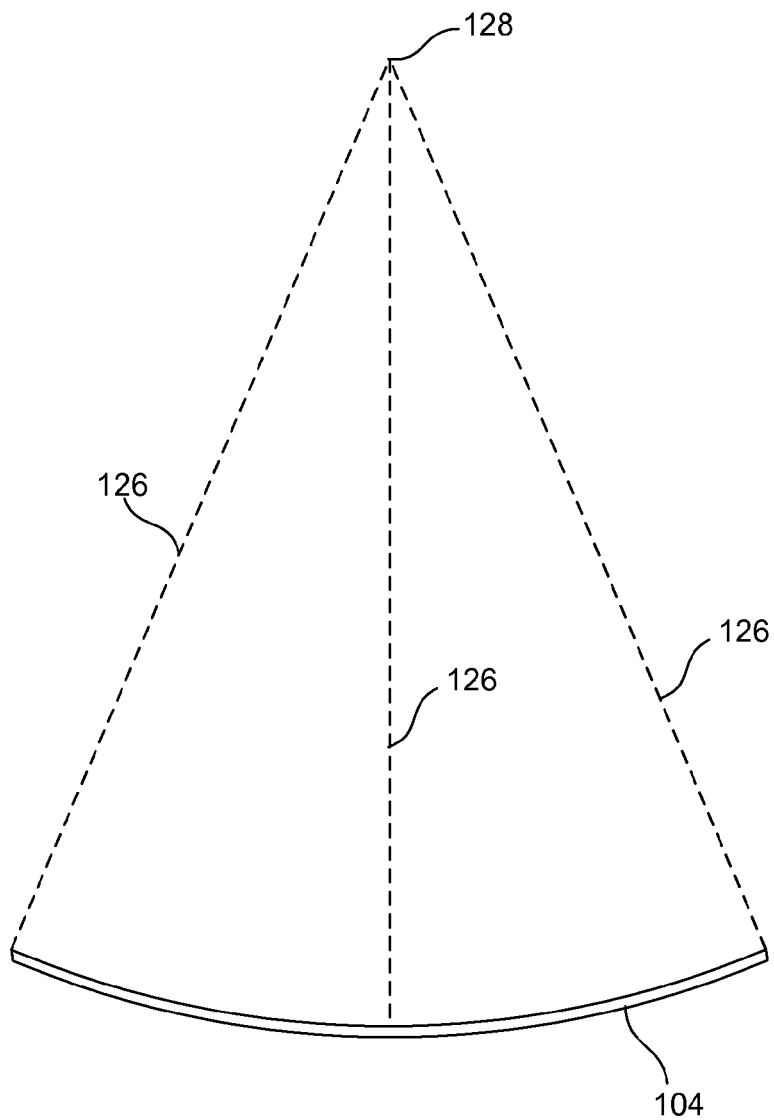
FIG. 3 depicts an embodiment of a track following an arc.

FIG. 3 depicts the track 104. The track 104 can be a rail along which the one or more track guides 114 can move or slide. The track 104 can be made of wood, plastic, metal, or any other material or combination of materials. In some embodiments, the track 104 can be curved along an arc. The arc can be a portion of a circle having a radius 126. The curved track 104 can have a focal point 128 at the center of the circle, such that the distance from the focal point 128 to any point on the track 104 is equal to the radius 126. In some embodiments, the radius 126 can be fixed, such that the curvature of the track 104 and the location of the focal point 128 remain fixed. In alternate embodiments, the radius 126 can be adjusted to change the curvature of the track 104 and the location of the focal point 128. The track 104 can have any arc length. In some embodiments, the track 104 can be a portion of a circle, a semi-circle, or a full circle.

Figure 4:
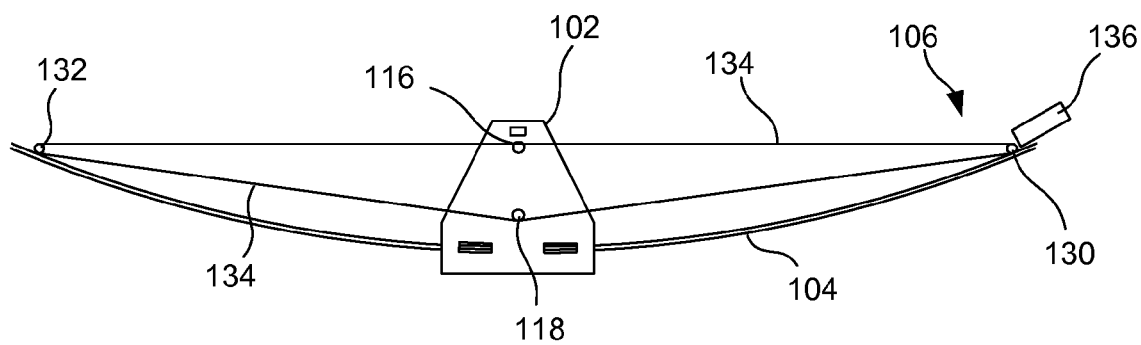
FIG. 4 depicts an embodiment of a pulley system for moving a dolly along a track.

FIG. 4 depicts the pulley system 106 coupled with the track 104 and the dolly 102. The pulley system 106 can comprise a drive pulley 130, a return pulley 132, and a cord 134. The drive pulley 130 can be a spool having space for the cord 134 to coil around the spool. The return pulley 132 can be an idler pulley, hook, loop, or any other protrusion. The cord 134 can be an elongated member such as a cable, rope, wire, chain, band, belt, or any other cord. In some embodiments, the pulley system 106 can further comprise an, electric motor 136 that can power the drive pulley 130. In alternate embodiments, the drive pulley 130 can be powered by a hand crank, gravity, elastic energy, or any other power source. In some embodiments, the speed of the drive pulley 130 and/or electric motor 136 can be controlled by a computer. The drive pulley 130 can be located at one end of the track 104. The return pulley 132 can be located at the other end of the track 104. The cord 134 can be coupled with the drive pulley 130, the return pulley 132, the front attachment points 116, and the back attachment points 118, such that the cord 134 forms a taut loop extending from the drive pulley 130 around the front attachment points 116, the return pulley 132, and the back attachment points 118. The sum of the interior angles of the taut loop can always equal 360 degrees.

Figure 5A:
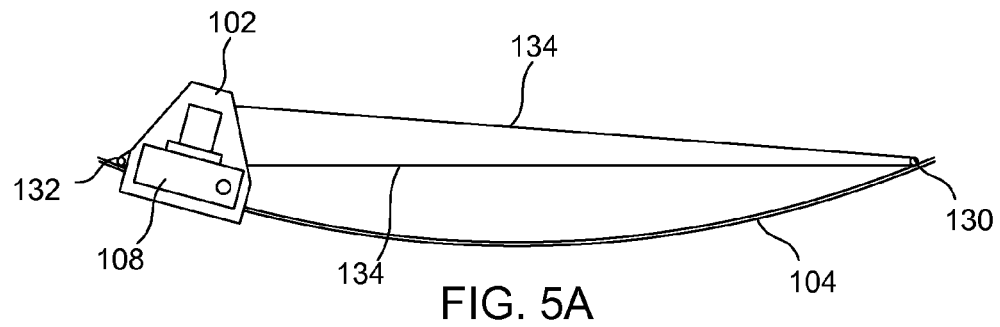
FIG. 5A depicts a camera at the left end of a track.
Figure 5B:
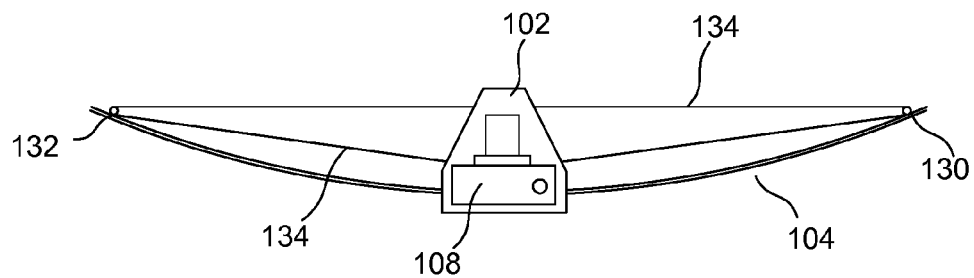
FIG. 5B depicts a camera at the midpoint of a track.
Figure 5C:
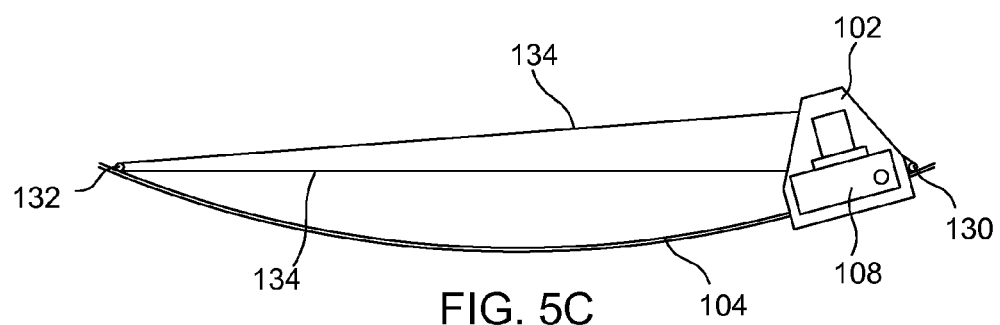
FIG. 5C depicts a camera at the right end of a track.

FIGS. 5A-5C depict the movement of the dolly 102 along the track 104. In operation, the drive pulley 130 can let out one end of the cord 134 at the same rate that it pulls in, the other end of the cord 134. The movement of the cord 134 can in turn move the front attachment points 116 and the back attachment points 118, thereby moving the dolly 102 along the track 104 at a constant rate and keeping the dolly 102 angled toward the focal point 128. As shown in FIG. 5A and FIG. 5C, when the dolly 102 is, at the left or right end of the track 104, the front portion of the cord 134 can be distended by the front attachment points 116, while the back portion of the cord 134 can be substantially straight between the drive pulley 130 and the return pulley 132. As shown in FIG. 5B, when the dolly 102 is at the midpoint of the track 104, the front portion of the cord 134 can be substantially straight between the drive pulley 130 and the return pulley 132, while the back portion of the cord 134 can be distended by the back attachment points 118. When the dolly 102 is at other locations on the track 104, the front portion of the cord 134 can be distended by the front attachment points 116 and the back portion of the cord 134 can also be distended by the back attachment points 118. The sum of the interior angles of the loop can remain 360 degrees regardless of the position of the dolly 102 on the track 104 or which portions of the cord 134 are distended.

Figure 6:
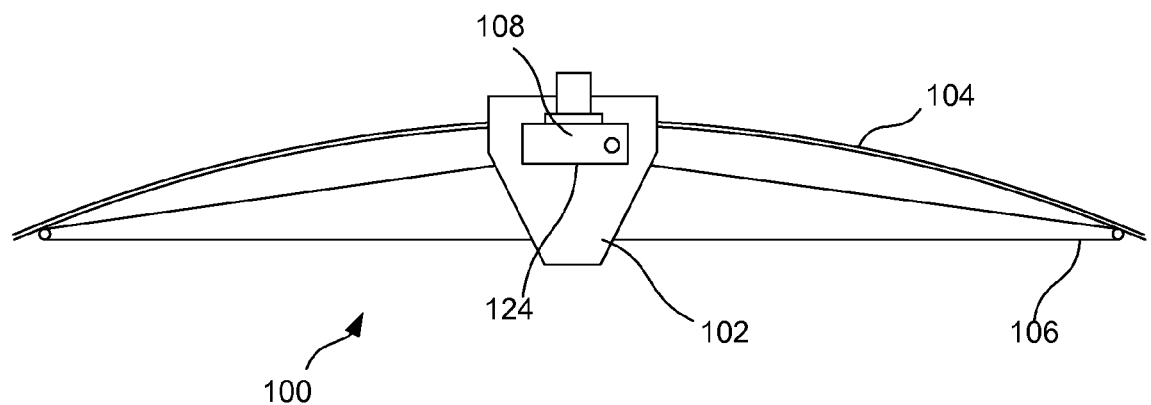
FIG. 6 depicts an embodiment of a scanning apparatus in a reversed orientation.

FIG. 6 depicts an embodiment of the scanning apparatus 100 with the camera 108 in a reverse orientation. In some embodiments, the camera 108 can be rotated and/or repositioned on the dolly 102. By way of a non-limiting example, as shown in FIG. 6 the camera 108 can be rotated 180 degrees from the orientation shown in FIG. 1. In alternate embodiments, the orientation of the camera 108 can be fixed on the dolly 102.

Figure 7:
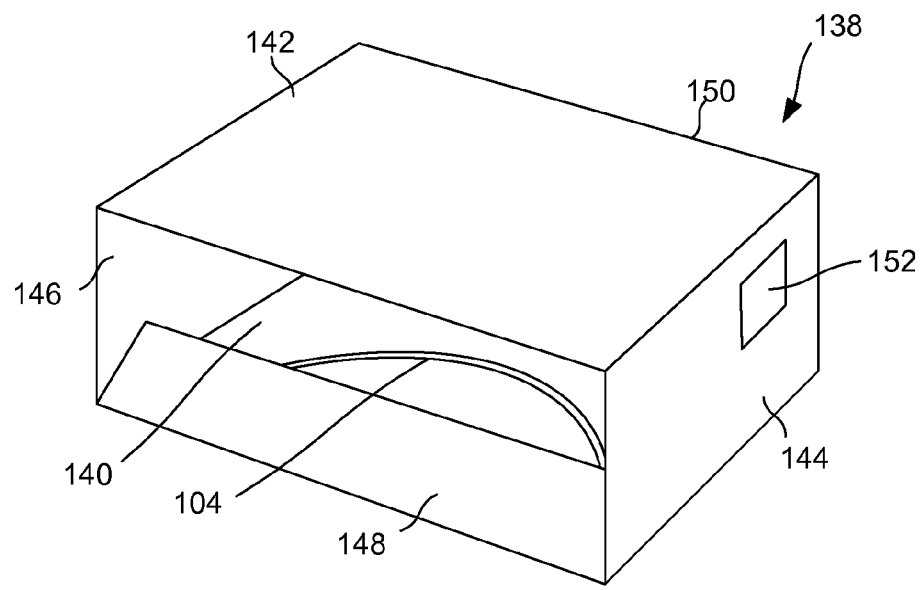
FIG. 7 depicts an embodiment, of an enclosure that can house a scanning apparatus.

FIG. 7 depicts an enclosure 138. In some embodiments, the scanning apparatus 100 can be housed within the enclosure 138. In some embodiments, the enclosure 138 can block light and/or reflections from areas the camera 108 is not pointed towards, which in some cases can increase the quality of pictures taken by the camera 108. The enclosure 138 can comprise a floor 140, a ceiling 142, a left wall 144, a right wall 146, a front wall 148, and a back wall 150. The front all 148 of the enclosure can be shorter than the left wall 144, right wall 146, and back wall 150, such that the front of the enclosure 138 is partially open to leave the camera 108 unobstructed when taking pictures. In some embodiments, the front wall 148 can be angled toward the interior of the enclosure 138. The floor 140, ceiling 142, left wall 144, right wall 146, front wall 148 and back wall 150 can be made of wood, plastic, metal, or any other material or combination of materials.

The track 104, the drive pulley 130, and the return pulley 132 can rest on or be coupled with the floor 140. In some embodiments, the back wall 150, the left wall 144, and/or the right wall 146 can have one or more access points 152. The access points 152 can be openings that can allow a user to gain access to the drive pulley 130, return pulley 132, track 104, camera 108, and/or dolly 102. In some embodiments, each access point 152 can comprise a door that can selectively close off the opening. In some embodiments, the floor 140, ceiling 142, left wall 144, right wall 146, front wall 148 and back wall 150 can be hingeably coupled with one another, such that the pieces can selectively rotate along the hinges to allow the enclosure 138 to be folded into a smaller form for storage, transport, or any other purpose.

Figure 8:
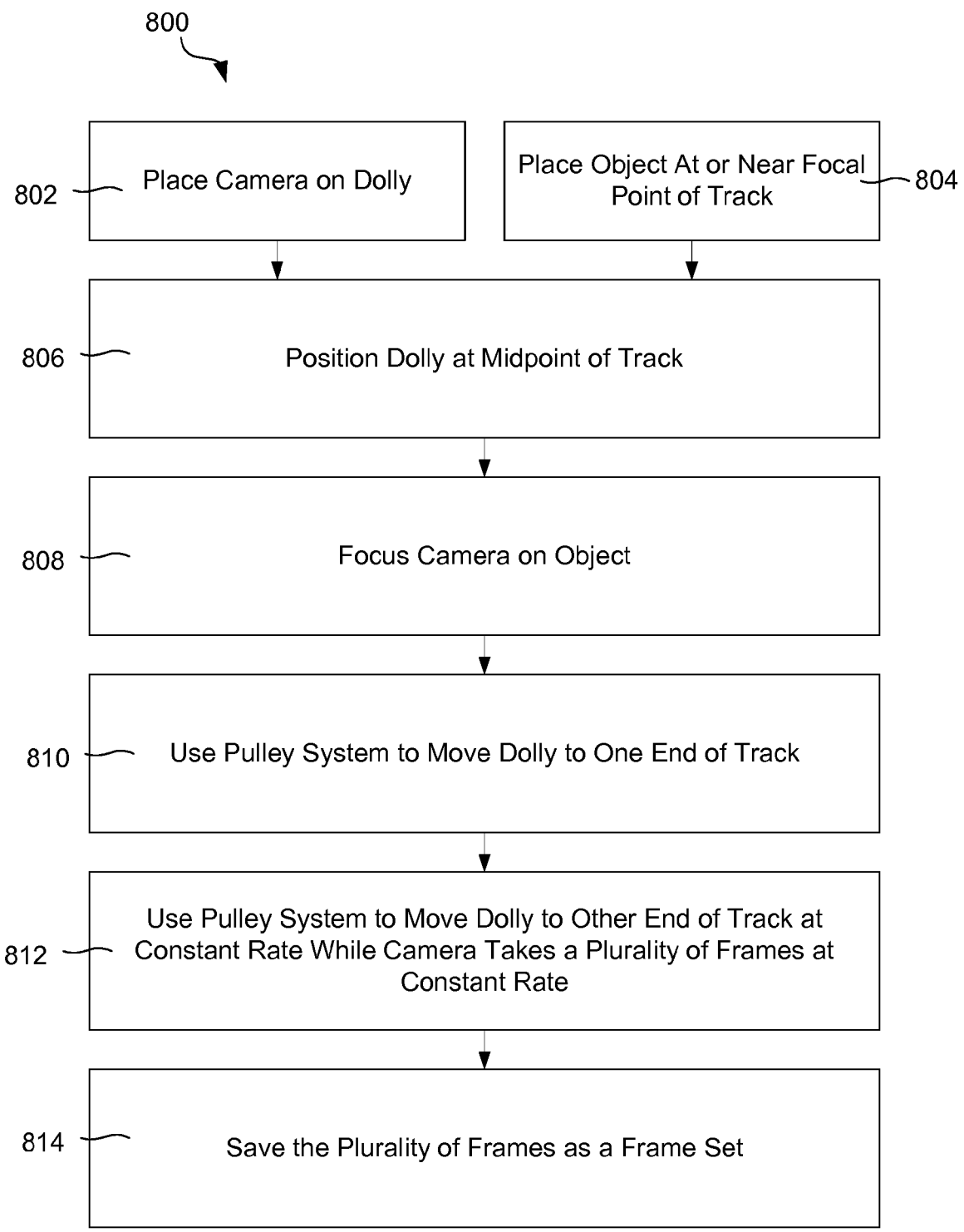
FIG. 8 depicts a method for scanning, an object.

FIG. 8 depicts a method 800 for scanning a single object using the scanning apparatus 100. At 802, the camera 108 can be placed on the dolly 104. At 804, the object can be placed at or near the focal point 128. At 806, the dolly 102 can be positioned at the midpoint of the track 104, as shown in FIG. 5B. At 808, the camera 108 can be focused on the object. In alternate embodiments, the camera 108 can be focused on the object at any point on the track 104. At 810, the pulley system 106 can move the dolly 102 to one end of the track 104, as shown in FIG. 5A. At 812, the pulley system 106 can move the dolly 102 along the track 104 to the other end of the track 104 at a constant rate. At 812, the camera 108 can be configured to take a plurality of frames of the object at a controlled rate as the dolly 102 is moved along the track 104. The frames can be discrete images of the object taken from different angles. In some embodiments, the photography rate of the camera 108 can be controlled by a computer. At 814, the plurality of frames can be saved as a frame set. The frame set can comprise any number of frames as desired. The process 800 can be repeated to scan additional objects.

The scanning apparatus 100 can also be positioned in the reverse orientation shown in FIG. 6 relative to the object being scanned, such that the focal point 128 of the arc of the track 104 is on the opposite side of the track 104 from the object being scanned. In this orientation, the reversed camera 102 can be moved along the track 104 as described above to capture frames from viewpoints radiating outward from the track 104 to different focal points, rather than viewpoints radiating toward a common focal point 128 as in FIGS. 5A-5C. In some embodiments and/or situations, the reversed orientation shown in FIG. 6 can be used to capture panoramic images and/or frame sets of large objects or scenes, such as backgrounds and landscapes.

A three dimensional image of a scene can be created by capturing a frame set of one or more objects individually by the scanning apparatus 100 using the process 800 or by any other camera system capable of taking discrete images of an object at different angles. In some embodiments, each object can be scanned in front of a chroma key screen such as a green screen, such that the background can be erased and the objects can be composited together into the final scene. Each frame set for each object can be individually composited into a temporary image. The temporary images can then be interlaced to create an interlaced image by taking vertical sections of the temporary image and horizontally compressing them into a smaller width to create slices. Any number of slices can be used as desired.

Figure 9:
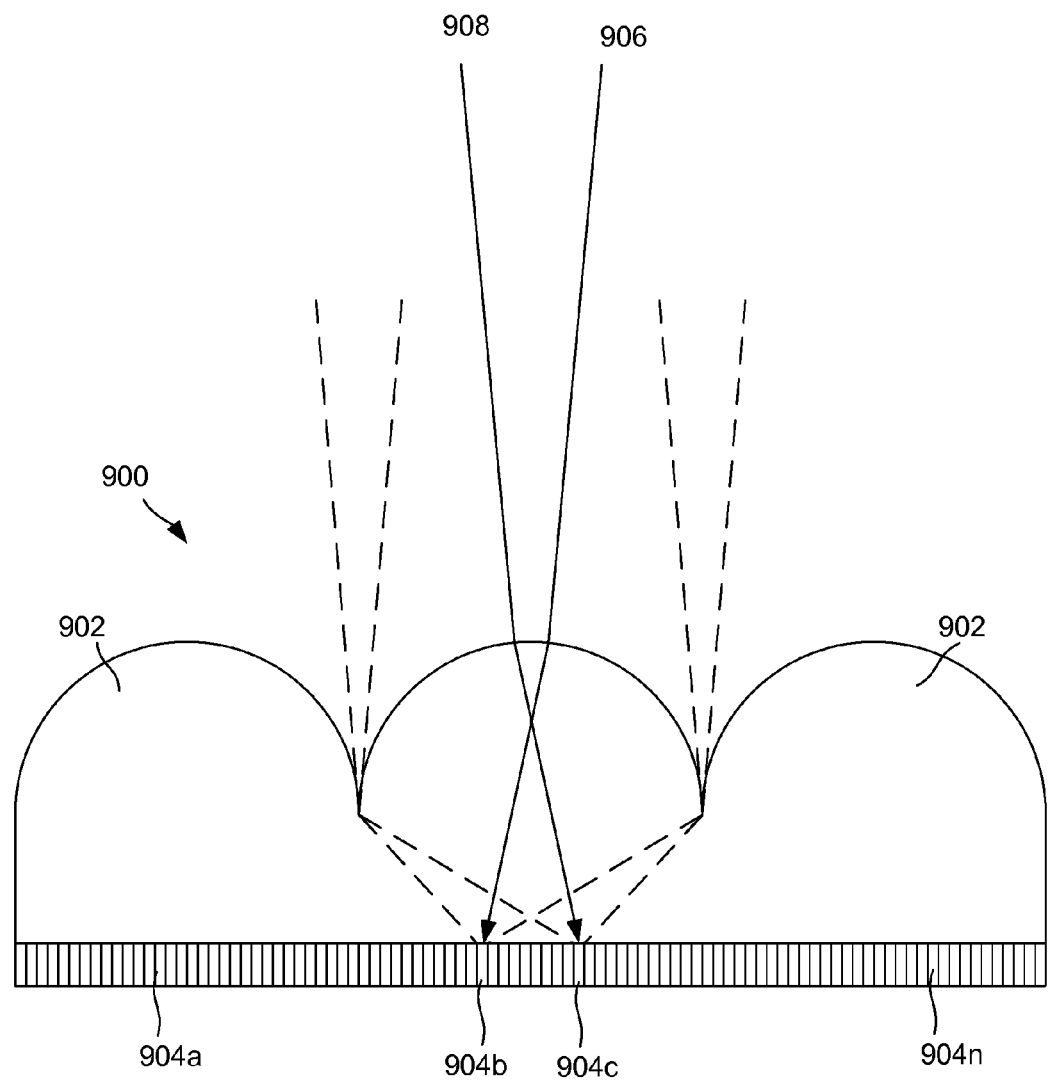
FIG. 9 depicts a cross section of a lenticular lens.

FIG. 9 depicts a cross section of a lenticular lens 900. A lenticular lens 900 can comprise a plurality of lenticules 902 positioned in rows parallel to one another. A lenticular lens 900 can comprise any number of lenticules 902 as desired. The lenticules 902 can be shaped such that each lenticule 902 magnifies one slice 904 of the interlaced image positioned beneath the lenticular lens 900. The slice 904 that is magnified by a lenticule 902 can depend on the angle at which the lenticule 902 is viewed, such that viewing the lenticule 902 from one angle can magnify a different slice 904 than when the lenticule 902 is viewed from any other angle. By way of a non-limiting example, slice 904b can be magnified and seen when viewed from angle 906, while slice 904c can be magnified and seen when viewed from angle 908, as shown in FIG. 8. The slices 904 corresponding to a single frame of each frame set can be seen from the same angle at each lenticule 902, thereby allowing a viewer to see complete frames of one or more objects that correspond to that viewing angle. Because each eye can view each lenticule 902 from a different viewing angle, each eye can see a different frame or composition of frames such that the viewer can perceive a three dimensional image. The viewing angles of the lenticular lens 900 can depend on the number of slices 904 and the shape of the lenticules 902.

The relative size of each, object within the three dimensional scene can be altered by changing the height and width of each frame within the object's frame set during composition of the temporary image. The horizontal and vertical position of each, object within the three dimensional scene can be altered by positioning the middle frame of the object's frame set at the intended horizontal and vertical position on the temporary image. The depth of each object within the three dimensional scene can be altered by changing the width between the focal point of each frame within the frame set for that object during composition of the temporary image.

Figure 10A:
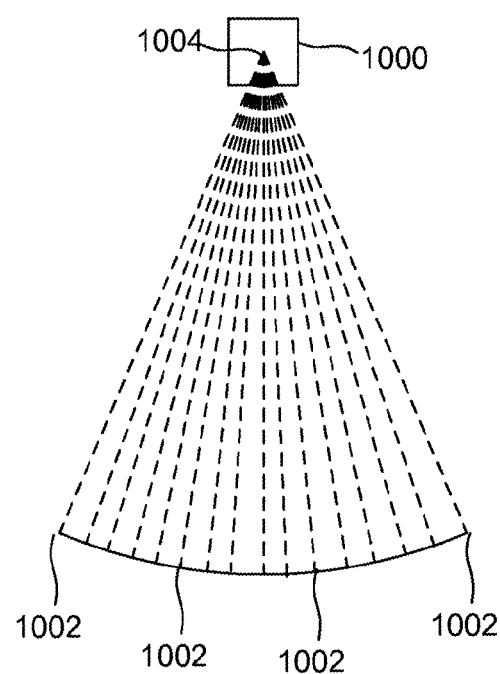
FIG. 10A depicts scanning angles of frames taken of an object.
Figure 10B:
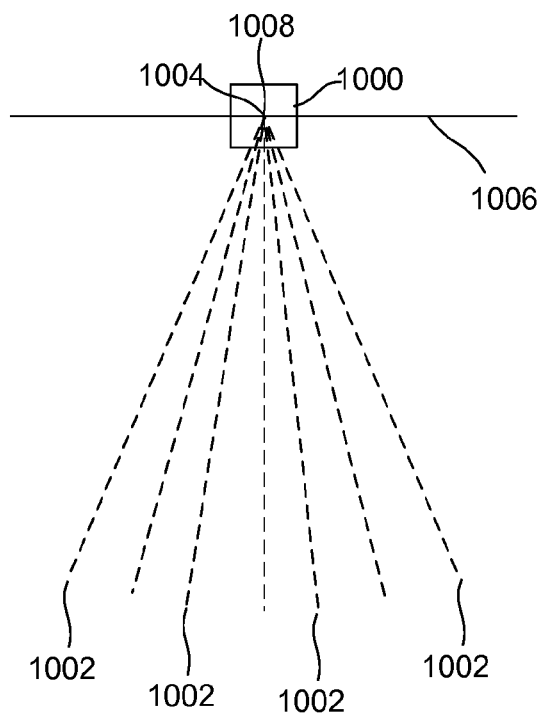
FIG. 10B depicts an object with a convergence point at the plane of a lenticular lens.

FIGS. 10A to 10D depict examples of an object 1000 that can be positioned within a three dimensional scene at a plane 1006 described by the plane of the lenticular lens 900, behind the plane 1006, or in front of the plane 1006. An object 1000 can be made to appear positioned at the plane 1006 of the lenticular lens 900 by matching the focal point 1004 of each frame such that the frames are overlaid on top of one another with each focal point 1004 at the same position, creating a frame set convergence point 1008 located at the plane 1006. For objects scanned by the scanning apparatus 100, the focal point 1004 of each frame can be the focal point 128. In some embodiments, each object 1000 can, be scanned at the same radius 126 with the same focal point 128, even if one or more objects 1000 appear at different depths in the final three dimensional image. By way of a non-limiting example, FIG. 1 0A depicts a top view of an object 1000 that has been scanned to create a frame set comprising frames taken at a plurality of locations 1002, where the focal point 1004 of each frame is focused on the center of the object 1000. FIG. 10B depicts a top of view of the plane 1006 of the lenticular lens 900. In this example, the focal point 1004 of each, frame has been overlaid at the same position on the temporary image, such that the viewpoints from locations 1002 converge at the frame set convergence point 1008, which is located on the plane 1006 such that the object 1000 can appear to be located at the plane 1006. In some embodiments, a subset of frames from the frame set can be used. The frames selected for the subset can be frames taken at angles that intersect with the viewing angles of the lenticular lens 900.

Figure 10D:
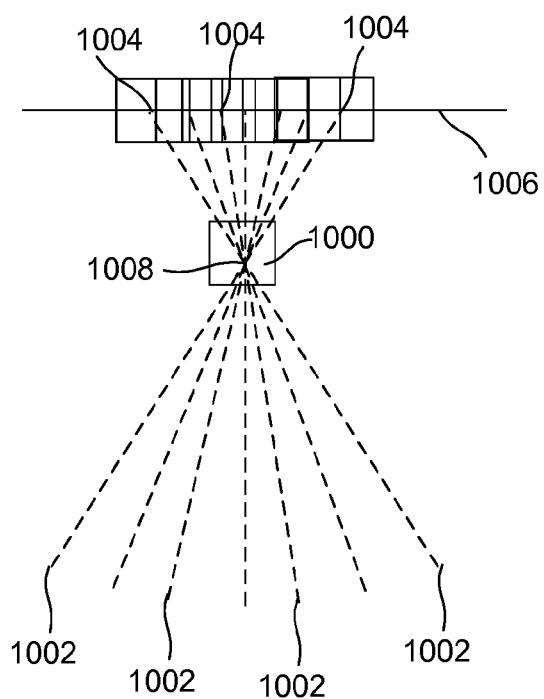
FIG. 10D depicts an object with a convergence point in front of the plane of a lenticular lens.
Figure 10C:
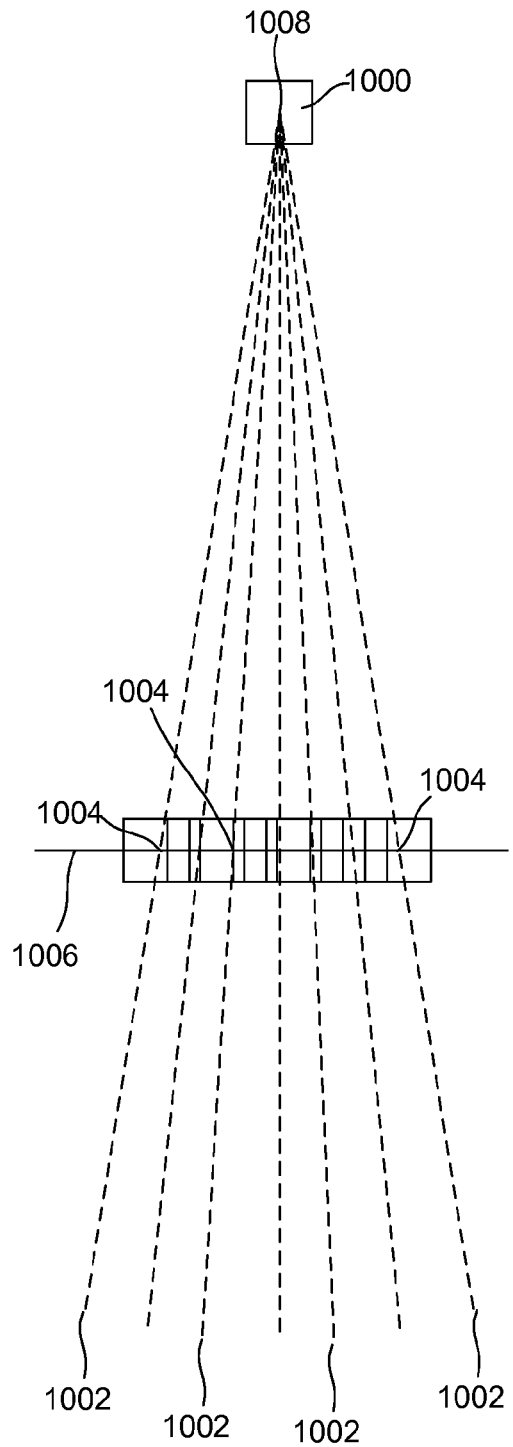
FIG. 10C depicts an object with a convergence point behind the plane of a lenticular lens.

An object 1000 can be made to appear positioned behind the plane 1006 of the lenticular lens 900 by spacing the focal point 1004 of each frame apart at a width such that the frame set convergence point 1008 appears to be behind the plane 1006. The width between the focal point 1004 of each frame can be increased to make the object 1000 appear deeper into the scene and farther behind the plane 1006. By way of a non-limiting example, FIG. 10C depicts that the focal points 1004 of the frames captured at the locations shown in FIG. 0A can be spaced apart on the temporary image such that the viewpoints from locations 1002 to the focal points 1004 can converge behind the plane 1006 of the lenticular lens 900. A viewer can perceive the object 1000 to be behind the plane 1006, at the location where the focal points 1004 of each frame converge. In some embodiments, a subset of frames from the complete frame set can be used. The frames selected for the subset can be frames taken at angles that intersect with the viewing angles of the lenticular lens 900. In alternate embodiments, the object 1000 can be scanned along a shorter arc length to obtain frames at angles closer to one another.

An object 1000 can be made to appear positioned in front of the plane 1006 of the lenticular lens 900 by reversing the order of the frames and spacing apart the focal point 1004 of each frame at a width such that the frame set convergence point 1008 appears to be in front of the plane 1006. The width can be increased to make the objects 1000 appear farther in front of the plane 1006 of the lenticular lens 900. By way of a non-limiting example, FIG. 10D depicts that the focal points 1004 of the frames captured at the locations shown in FIG. 10A can be reversed and spaced apart on the temporary image such that the viewpoints from locations 1002 to the focal points 1004 can converge in front of the plane 1006 of the lenticular lens 900. A viewer can perceive the object 1000 to be in front of the plane 1006, at the location where the focal points 1004 of each frame converge. The focal points 1004 can converge in front of the plane 1006 because the order of the frames has been reversed. In some embodiments, a subset of frames from the complete frame set can be used. The frames selected for the subset can be frames taken at angles that intersect with the viewing angles of the lenticular lens 900. In alternate embodiments, the object 1000 can be scanned along a longer arc length to obtain frames at angles farther away from one another.

Figure 11:
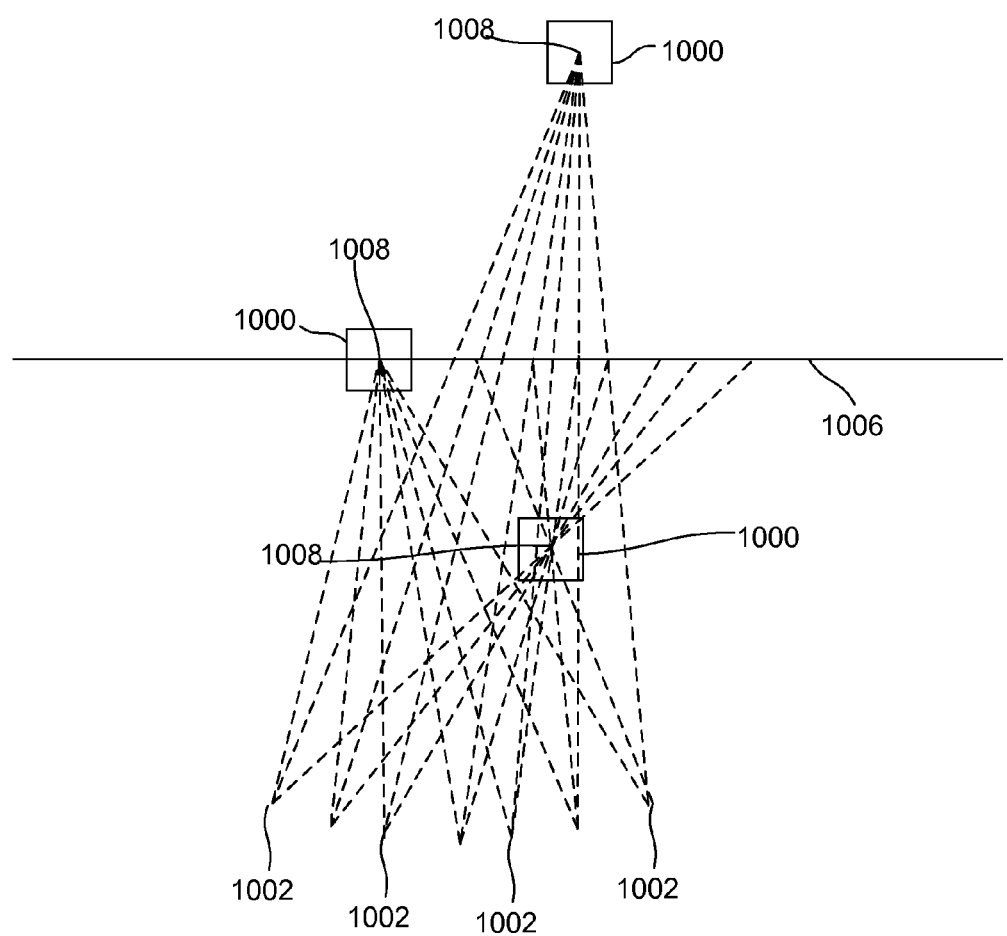
FIG. 11 depicts a three dimensional scene comprising multiple objects at different positions and depths.

As depicted by the example shown in FIG. 11, a three dimensional scene can comprise a plurality of objects 1000 at different locations and depths. Each object can be scanned individually such that each object 1000 has its own frame set. Each object 1000 can then be composited individually into the temporary image at its intended location. Each object 1000 can have its own depth by altering the width between the focal point 1004 of each frame and/or the order of the frames in the object's frame set. The height and width of each frame within the frame set can also be altered to change the relative size of each object 1000 in the scene. Each object 1000 in the three dimensional scene can have its own convergence point 1008 such that a viewer can choose to focus on a specific object from any location 1002. In some embodiments, the frames used for each object 1000 can, be a subset of the complete frame set for that object 1000, which can allow only certain frames to be used that match with the viewing angles and locations 1002. In other embodiments, the frames needed for each object 1000 can be determined in advance such that only the necessary frames for the intended location are captured during the scanning process.

In some embodiments, the frame sets for each object 1000 can comprise the same number of frames. In alternate embodiments, the frame sets for each object 1000 can comprise a different number of frames. The number of frames taken can be adjusted by adjusting the rate of photography and/or the rate of camera movement as a camera moves around the object. In some embodiments, the same number of frames can be taken for each object 1000, but a subset of the frames can be used depending on the location and depth of the object 1000 within the three dimensional scene. By way of a non-limiting example, an object 1000 positioned toward the right side of the scene can use frames taken from locations on the left side of the object 1000. By way of another non-limiting example, an object 1000 positioned farther behind the plane 1006 can use frames taken at angles that are closer together by increasing the number of frames taken overall, or taking the same number of frames over a shorter arc length.

Each object 1000 within, a three dimensional scene can be presented such that as a viewer moves between different viewpoints the object 1000 can appear to be motionless, rotate away from the viewer, rotate toward the viewer, or follow the viewer. The animation of each object 1000 can depend on whether the frame set for that object 1000 is orthoscopic, hyperscopic, hyposcopic, or pseudoscopic. In some embodiments, one or more of these animation techniques can be combined.

An orthoscopic frame set can be used to present an object 1000 that appears stable and motionless as the viewer moves between different viewpoints. An orthoscopic frame set can comprise frames taken at locations at evenly spaced angles around the object 1000. An orthoscopic frame set can comprise any number of frames taken at any number of different angles. The frames can be presented to the viewer such that at each angle at which the viewer can see the object 1000, the viewer can see the frame of the object 1000 that was taken at that angle. In some embodiments, the orthoscopic frame set can comprise all frames taken of the object 1000. In alternate embodiments, a default frame set can be taken with more frames than are needed, and the orthoscopic frame set can be a subset of the default frame set.

Figure 12A:
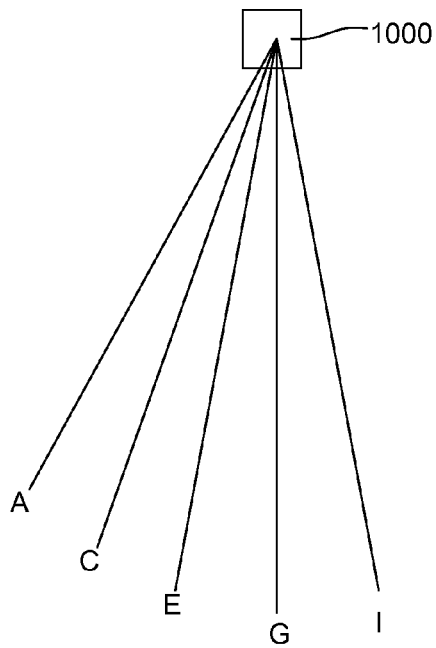
FIG. 12A depicts a top view of an example of viewpoints from which an orthoscopic object can be scanned and perceived.
Figure 12B:
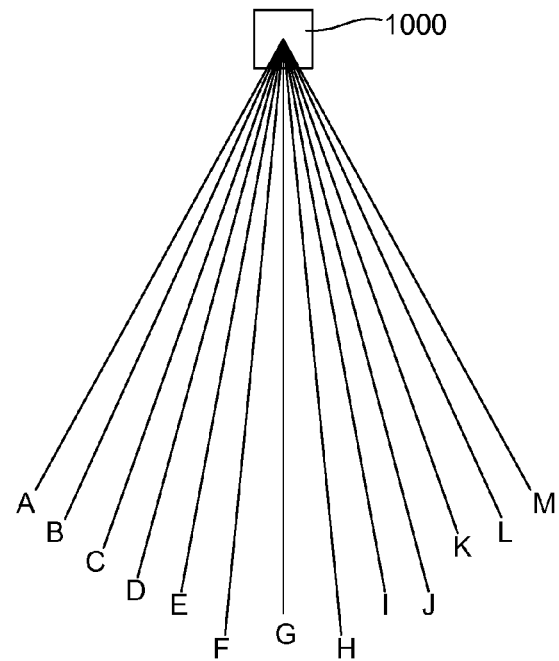
FIG. 12B depicts a top view of an example of viewpoints from which a default frame set can be captured.
Figure 12C:
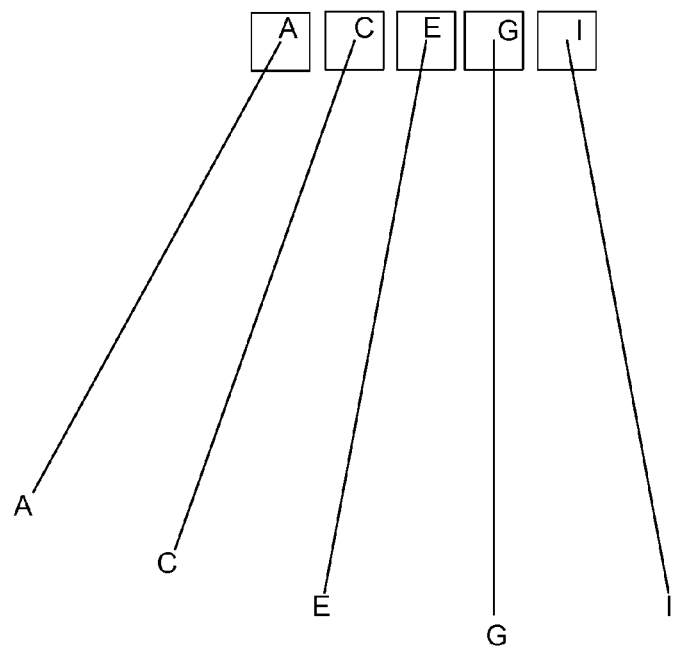
FIG. 12C depicts a top view of an example of individual viewpoints of an orthoscopic object.

By way of a non-limiting example, in some embodiments an orthoscopic frame set can be a set of frames of an object 1000 taken along viewpoints A, C, E, G, and I, as shown in FIG. 12A. In alternate embodiments, a default frame set can comprise frames taken along viewpoints A through M, as shown in FIG. 12B, and the orthoscopic frame set can be a subset of the default frame set comprising the frames from viewpoints A, C, E, G, and, I. In this example, these frames can be used in the temporary image, interlaced, and viewed through a lenticular lens, such that the object 1000 can appear to remain motionless within the three dimensional space as the viewer moves from viewpoint A to viewpoint I. FIG. 12C depicts a top view of each individual viewpoint from viewpoint A to viewpoint I, illustrating that the orthoscopic object 1000 does not change orientation depending on the viewpoint.

A hyperscopic frame set can be used to present an object 1000 that appears to rotate away from the viewer as the viewer moves between different viewpoints. A hyperscopic frame set can comprise frames taken at angles that are closer together than the angles that would be needed for an orthoscopic frame set, causing the object 1000 to be oversampled. In some embodiments, the hyperscopic frame set can comprise frames taken at a higher frequency than would be needed for an orthoscopic frame set. In alternate embodiments, a default frame set can be taken, as in the example shown by FIG. 12B, and the hyperscopic frame set can be a subset of the default frame set, such that the frames in the hyperscopic frame set are taken closer together than the frames that would be used for an orthoscopic frame set.

By way of a non-limiting example, if an object can be scanned at viewpoints A, C, E, G, and I to present an orthoscopic object, the object can be scanned at angles A, B, C, D, and E to present a hyperscopic object, as shown in FIG. 13A. The hyperscopic frame set can be manipulated in the temporary image to present the hyperscopic frame set at the same viewpoints at which an orthoscopic frame set would be presented. For instance, as shown in FIG. 13B, the frame taken at viewpoint A can be presented at viewpoint A, the frame taken at viewpoint B can be presented at viewpoint C the frame taken at viewpoint C can be presented at viewpoint E, the frame taken at viewpoint D can be presented at viewpoint G, and the frame taken at viewpoint E can be presented at viewpoint I. In this example, the frames can be used in the temporary image, interlaced, and viewed through a lenticular lens, such that the object 1000 can appear to rotate counterclockwise around a vertical axis within the three dimensional space as the viewer moves from viewpoint A to viewpoint I, which can make the object appear to rotate away from the viewer. FIG. 13C depicts a top view of each individual viewpoint from viewpoint A to viewpoint I, illustrating that the hyperscopic object 1000 can change its orientation depending on the viewpoint.

A hyposcopic frame set can be used to present an object 1000 that appears to rotate towards the viewer as the viewer moves between different viewpoints. A hyposcopic frame set can comprise frames taken at angles that are farther away from each other than the angles that would be needed for an orthoscopic frame set, causing the object 1000 to be undersampled. In some embodiments, the hyposcopic frame set can comprise frames taken at a lower frequency than would be needed for an orthoscopic frame set. In alternate embodiments, a default frame set can be taken, as in the example shown by FIG. 12B, and the hyposcopic frame set can be a subset of the default frame set, such that the frames in the hyperscopic frame set are taken farther away from each other than the frames that would be used in an orthoscopic frame set.

Figure 14A:
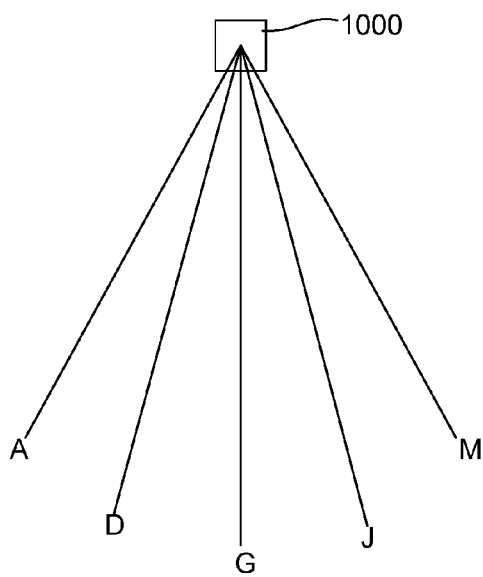
FIG. 14A depicts a top view of an example of viewpoints from which a hyposcopic object can be scanned.
Figure 14B:
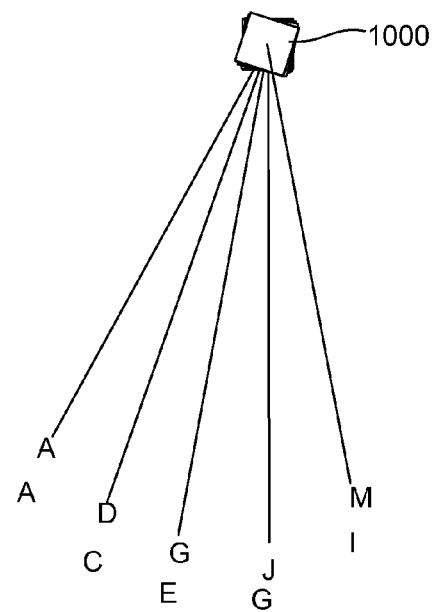
FIG. 14B depicts atop' view of an example of hyposcopic frames manipulated to be seen from different viewpoints.
Figure 14C:
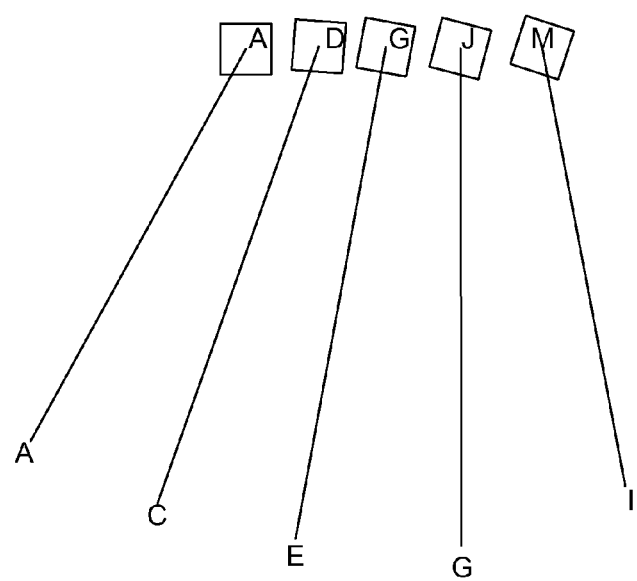
FIG. 14C depicts a top view of an, example of individual viewpoints of a hyposcopic object.

By way of a non-limiting example, if an object can be scanned at viewpoints A, C, E, G, and I to present an orthoscopic object, the object can be scanned at viewpoints A, D, G, J, and NI to present a hyposcopic object, as shown in FIG. 14A. The hyposcopic frame set can be manipulated to present the hyposcopic frame set at the same viewpoints at which an orthoscopic frame set would be presented. For instance, as shown in FIG. 14B, in this example the frame taken at viewpoint A can be presented at viewpoint A, the frame taken at viewpoint D can be presented at viewpoint C, the frame taken, at viewpoint G can be presented at viewpoint E, the frame taken at viewpoint J can be presented at viewpoint G, and the frame taken at viewpoint M can be presented at viewpoint I. In this example, these frames can be used in the temporary image, interlaced, and viewed through a lenticular lens, such that the object 1000 can appear to rotate clockwise around a vertical axis within the three dimensional space as the viewer moves along a horizontal plane from viewpoint A to viewpoint I, which can make the object 1000 appear to rotate toward the viewer. FIG. 14C depicts a top view of each individual viewpoint from viewpoint A to viewpoint I, illustrating that the hyposcopic object 1000 can change its orientation depending on the viewpoint.

A pseudoscopic frame set can be used to present an object 1000 that appears to rotate to follow the viewer as the viewer moves between different viewpoints. A pseudoscopic frame set can comprise frames taken at the same angles as the angles that would be needed for an orthoscopic frame set, but in reverse order, causing the object 1000 to be reverse sampled. In some embodiments, the pseudoscopic frame set can comprise frames taken in an order reversed from the frames that would be needed for an orthoscopic frame set. In alternate embodiments, a default frame set can be taken, as in the example shown by FIG. 12B, and the pseudoscopic frame set can be a subset of the default frame set, such that the frames in the pseudoscopic frame set are arranged in a reverse order on the temporary image than the frames that would be used in an orthoscopic frame set.

Figure 15A:
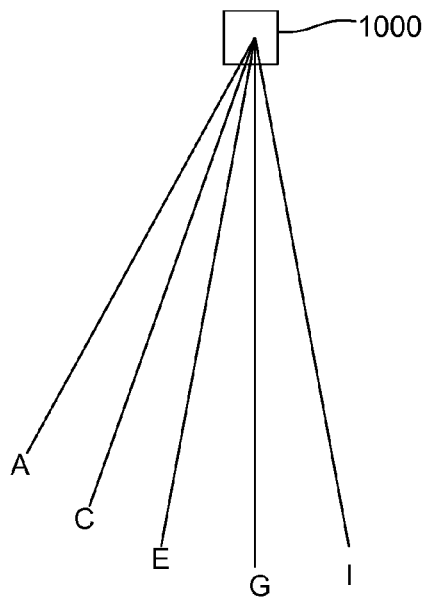
FIG. 15A depicts a top view of an example of viewpoints from which a pseudoscopic object can be scanned.
Figure 15B:
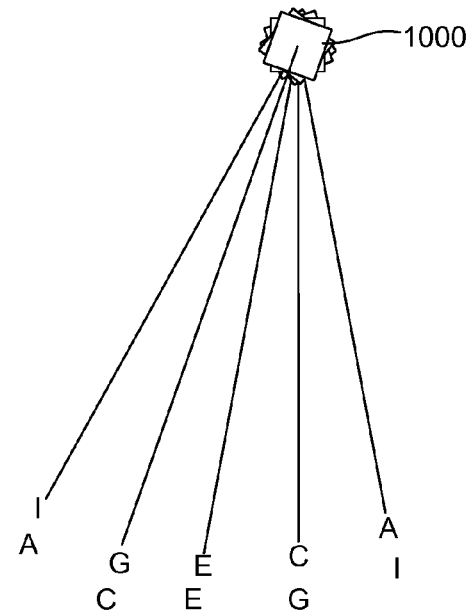
FIG. 15B depicts a top view of an example of pseudoscopic frames manipulated to be seen from different viewpoints.
Figure 15C:
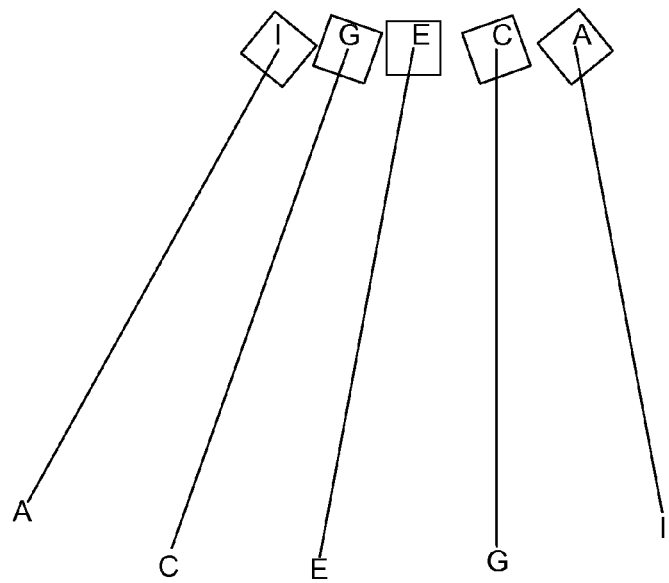
FIG. 15C depicts a top view of an example of individual viewpoints of a pseudoscopic object.

By way of a non-limiting example, if an object 1000 can be scanned at viewpoints A, C, E, G, and I to present an orthoscopic object, the object can be scanned at viewpoints I, G, E, C, and A to present a pseudoscopic object, as shown in FIG. 15A. The pseudoscopic, frame set can be manipulated to present the pseudoscopic frame set at the same viewpoints at which an orthoscopic frame set would be presented. For instance, as shown in FIG. 15B, the frame taken, at viewpoint I can be presented at viewpoint A, the frame taken at viewpoint G can be presented at viewpoint C, the frame taken at viewpoint E can be presented at viewpoint E, the frame taken at viewpoint C can be presented at viewpoint G, and the frame taken at viewpoint A can be presented at viewpoint I. In this example, these frames can be used in the temporary image, interlaced, and viewed through a lenticular lens, such that the object 1000 can appear to rotate around a vertical axis within the three dimensional space as the viewer moves from viewpoint A to viewpoint I, which can make the object appear to follow the viewer. FIG. 15C depicts a top view of each individual viewpoint from viewpoint A to viewpoint I, illustrating that the pseudoscopic object 1000 can change its orientation depending on the viewpoint.

In some embodiments, one or more animation techniques can be used with one or more objects 1000 within a three dimensional scene. In some embodiments, one or more animation techniques can be combined with the horizontal, vertical, and depth positioning techniques described with reference to FIG. 10A through FIG. 11 to create an animated object 1000 at any intended location and depth within a three dimensional scene.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

What is claimed is:

1. A scanning apparatus, comprising:
   a curved track,
   a dolly mounted on said curved track, wherein said dolly is configured to support a camera,
   a pulley system coupled with a first point on said curved track, a second point on said curved track, and said dolly, said pulley system being configured to move said dolly along said curved track between said first point and said second point.

2. The scanning apparatus of claim 1, wherein:
   said dolly comprises a front attachment point and a back attachment point, and
   said pulley system comprises a drive pulley at said first point on said curved track, a return pulley at said second point on said curved track, and a cord coupled with said drive pulley, said front attachment point, and said back attachment point, such that said cord forms a loop extending from said drive pulley to said front attachment point, around said return pulley, to said back attachment point, and returning to said drive pulley.

3. The scanning apparatus of claim 2, wherein said drive pulley is configured to let out one end of said cord from said drive pulley and pull in the opposing end of said cord into said drive pulley at the same rate.

4. The scanning apparatus of claim 2, further comprising a motor coupled with said drive pulley, said motor being configured to power said drive pulley.

5. The scanning apparatus of claim 1, wherein said dolly comprises a platform, one or more wheels coupled with the underside of the platform, and one or more track guides on the underside of the platform, said track guides being configured to slidably couple with said curved track.

6. The scanning apparatus of claim 1, wherein said dolly comprises an attachment mechanism configured to hold said camera in place on said dolly.

7. The scanning apparatus of claim 1, further comprising an enclosure having a front wall, a plurality of side walls, a ceiling and a floor, wherein said curved track is coupled with said floor.

8. The scanning apparatus of claim 7, wherein said front wall is shorter than said plurality of side walls, such that said camera is at a level above the top edge of said front wall when said camera is supported on said dolly and when said dolly is mounted on said curved track.

9. The scanning apparatus of claim 7, wherein said front wall, said plurality of side walls, said ceiling and said floor are hingedly coupled with one another, such that said enclosure is foldable into a smaller form.

* * * * *